(12) United States Patent
Chou

(10) Patent No.: US 7,204,604 B2
(45) Date of Patent: Apr. 17, 2007

(54) SUPPORT MEMBER AND LIGHT EMITTING DIODE MODULE USING THE SAME

(75) Inventor: Shen-Hong Chou, Miao Li Hsien (TW)

(73) Assignee: AU Optronics Corp., Hsinchu (TW)

( * ) Notice: Subject to any disclaimer, the term of this patent is extended or adjusted under 35 U.S.C. 154(b) by 246 days.

(21) Appl. No.: 11/055,684

(22) Filed: Feb. 11, 2005

(65) Prior Publication Data

US 2005/0281050 A1    Dec. 22, 2005

(30) Foreign Application Priority Data

Jun. 18, 2004  (TW)  ............................. 93117753 A

(51) Int. Cl.
*F21V 7/04* (2006.01)

(52) U.S. Cl. .............. 362/227; 362/634; 362/612; 362/633

(58) Field of Classification Search ........... 362/227, 362/634, 633, 600; 349/58; 361/806
See application file for complete search history.

(56) References Cited

U.S. PATENT DOCUMENTS

| | | | | |
|---|---|---|---|---|
| 4,254,453 A | * | 3/1981 | Mouyard et al. | 362/240 |
| 4,271,408 A | * | 6/1981 | Teshima et al. | 345/83 |
| 4,485,377 A | * | 11/1984 | Claus et al. | 345/82 |
| 4,935,665 A | * | 6/1990 | Murata | 313/500 |
| 5,093,768 A | * | 3/1992 | Ohe | 362/241 |
| 5,226,723 A | * | 7/1993 | Chen | 362/241 |
| 5,490,048 A | * | 2/1996 | Brassier et al. | 362/238 |
| 5,515,253 A | * | 5/1996 | Sjobom | 362/244 |
| 6,375,340 B1 | * | 4/2002 | Biebl et al. | 362/294 |
| 6,974,221 B2 | * | 12/2005 | Wu et al. | 362/29 |
| 7,033,060 B2 | * | 4/2006 | Dubuc | 362/600 |

\* cited by examiner

*Primary Examiner*—Sandra O'Shea
*Assistant Examiner*—Anabel Ton
(74) *Attorney, Agent, or Firm*—Troxell Law Office, PLLC

(57) ABSTRACT

An LED module includes a housing, a support member disposed in the housing and having a lower portion supporting a reflective plate thereabove, and a cone-shaped protrusive portion projecting upwardly from the lower portion to support a diffusing plate thereabove so as to prevent the occurrence of downward bending of the middle portions of the reflective and diffusing plates due to their weights.

20 Claims, 3 Drawing Sheets

SUPPORT MEMBER AND LIGHT EMITTING DIODE MODULE USING THE SAME

FIELD OF THE INVENTION

The present invention relates to a light emitting diode (LED) module, more particularly to an LED module with a support member to prevent downward bending of light reflective and diffusing plates therein.

BACKGROUND OF THE INVENTION

Due to rapid advance in the electronic manufacture technology, a breakthrough in the light-production effect of the LED helps to improve the display ability of the LCD screens. Technically speaking, the LED has presently reached the extent of serving half the ability of cold cathode tube. It is hoped that by the year 2005, the light-production effect of the LED may exceed than that of the cold cathode tube. Due to swift response and since the LED can emit visible light, such as red, blue and green, the high cost color filters presently used in the LCD screen are likely replaced by the LEDs in the near future so as to provide wonderful images and sufficient brightness to the LCD screen. In view of lesser power consumption but providing higher lighting efficiency and longer service life, the role of the LED in the LCD device production is considerably prospective. Once the light-production effect of the LED is equal to or exceeds that of the cold cathode tube, the use of LED in the electronic devices will become much important. Presently, LEDs has been successfully used in traffic lights due to their ability in producing red and green colors. If the light-production effect of the LED can be elevated to a certain extent, the possibility of the LED to totally replace current light emitting lamps would be feasible. Also, it is well known that the LED is superior to the conventional light emitting in lower power consuming and low heat generation.

Referring to FIG. 1, a partially fragmentary view of a conventional LED module 10 is shown to include a housing 12, a circuit board 13, an LED 14, a light reflective plate 16 and a light diffusing plate 18. The conventional LED module 10 can be used in the light emitting lamp or a traffic light. It can also serve as the backlight light module of an LCD device. In the conventional LED module, the circuit board 13 is electrically connected to the LED so as to control the activation of the latter. In other electronic device, the circuit board 13 is used to control the display of the LCD device that is mounted above the conventional LED module.

As illustrated in FIG. 1, the LED 14 has a mounting portion 143 mounted on the circuit board 13, and a light-emitting portion 141. In another conventional LED module, the LED can be directly mounted on a base plate of the housing 12 (not shown).

The light reflective plate 16 can reflected the light beams emitted from the light-emitting portion 141 of the LED 14 upward, thereby effectively employing the light beams thereof. The outer periphery of the light reflective plate 16 is mounted on the housing 12 above the base plate, and has an LED hole exposing the light-emitting portion 141 above the reflective plate 16 while the mounting portion 143 of the LED is disposed below the reflective plate 16. In some prior technique, the mounting portion 143 of the LED 14 is used for supporting the reflective plate 16 thereabove.

The outer periphery of the light diffusing plate 18 is mounted on the housing 12 above the reflective plate 16 so that the diffusing plate 18 can diffuse the light beams reflected by the reflective plate 16, thereby causing several light reflection actions between the diffusing and the reflective plates 18, 16, which, in turn, provides incredible brightness of the LED 14.

FIG. 2 illustrates a partially fragmentary view of another conventional LED module 20 which includes an LED 14 that emits light beams in sidewise manner such that majority of the light beams will not reflect upward. Unlike to the previous conventional LED module 10, the conventional LED module 20 shown in FIG. 2 has an auxiliary diffusing plate 22 disposed in the housing 12 between the reflective plate 16 and the diffusing plate 18 more closer to the former such that the auxiliary diffusing plate 22 provides wider angle of light reflection by virtue of wider angle of incidence when the light beams emitted by the LED hit the auxiliary diffusing plate 22. The wider angle of reflection enhances the upward scattering light beams, thereby reflecting the entire portion of the light beams in order to provide effective brightness of the LED. Due to aforesaid reasons, the conventional LED module of FIG. 2 provides a better color mixing effect. Under the present condition, it is desired to select the LED module of FIG. 2 for use in the display of the LCD system so as to provide uniform brightness throughout the entire length of the display.

Presently, the LED module is used only in the small-sized LCD device, such as handheld PDA with LCD screen. The researchers in the LCD manufacturing world are eager to solve the possible difficulties once the LED modules are employed in the large-sized LCD device since the larger or wider LCD screen requires a larger LED module as its backlight module. As illustrated in FIGS. 1 and 2, increase in the dimension of the LED module consequently requires a larger number of LEDs therein. In other words, the sizes of the reflective plate 16, the diffusing plate 18, and the auxiliary diffusing plate 22 must also be increased, thereby causing the middle portion of these plates to bend downward by virtue of gravity. The housing 12 has to burden a relatively large amount of weight and subsequently weakening the rigidity of the housing 12. In addition, the downward bending of these plates is aggravated since the reflective plate 16 is generally made from metal. (Aluminum) and the diffusing plates 18, 22 are made from glass or acrylic materials which are susceptible to bend. The downward bending of these plates within the LED module can result in uneven scattering of light beams in the LED module, hence degrading the display ability of the LCD device.

SUMMARY OF THE INVENTION

The object of the present invention is to provide an LED module that is provided with a support member for supporting the reflective and diffusing plates, and thereby to prevent the occurrence of downward bending of these plates. The LED module can be used in the light emitting lamps or traffic lights. Alternatively, the LED module of the present invention can serve as the backlight module for the display of the LCD device.

In accordance with the present invention, the LED module can include a housing, a circuit board, at least one LED, at least one support member, a reflective plate and a diffusing plate.

The housing of the present invention further has a base plate for mounting thereupon the circuit board. The circuit board is electrically connected to the LED/LEDs for controlling purposes. The circuit board can also serve to control the LCD located above the LED module.

The LED of the present invention is divided into an upper light-emitting portion and a lower mounting portion. The mounting portion is disposed on the base plate of the housing (particularly, on the circuit board). The light-emitting portion is known as the light source for the LED module.

The support member of the present invention can be further divided into a lower portion and an upper cone-shaped protrusive portion. The lower portion is mounted on the base plate of the housing (particularly, on the circuit board). The cone-shaped protrusive portion located on top of the lower portion is extended upward away the base plate.

The reflective plate of the present invention, mounted above the lower portion of the support member and the mounting portion of the LED, is used to reflect upward the light ray of the light-emitting portion of the LED/LEDs so that the light provided by the LED/LEDs can be completely utilized in the LCD module. The reflective plate further has at least one LED hole and at least one support hole. The LED hole is sleeved around the respective LED, while the support hole is sleeved around the respective support member.

The diffusing plate, supported by the cone-shaped protrusive portion and thus disposed above the reflective plate, is to utilize the difference between the reflectivity of its own property and that of the air to reflect reciprocally part of the light between the diffusing plate and the reflective plate. Upon such an arrangement, the light emitted by the LED/LEDs can be thoroughly mixed so as to make the light homogeneous brightness and color-ness.

In the LED module in accordance with the present invention, the number of the support members used in a particular embodiment is judged by the dimension of the LED module. Preferably, the cone-shaped protrusive portion of the support member can have a white outer surface so as to reduce its interfere to the light quality. Else, the cone-shaped protrusive portion of the support member can be made of a transparent or translucent material so that its effect upon the light propagation between the diffusing plate and the reflective plate can be reduced to a minimum.

In the present invention, by providing the support member, manufacturing defects possible in the reflective plate, the diffusing plate and even an auxiliary diffusing plate can be substantially neglected. Also, following improvement such as laminating of additional optical layers on the diffusing plate can be safely constructed without damaging the optical performance of the LED module.

In summary, the LED module as well as the support member in accordance with the present invention can minimize the influence of the manufacturing defects, especially the dents, in the reflective plate and the diffusing plate. In particular, by introducing the support member, the mounting smoothness in the reflective plate and the diffusing plate can be ensured such that the homogeneous light quality of the LED module can be easily maintained.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCRIPTIONS OF THE PREFERRED EMBODIMENTS

Figure 3:
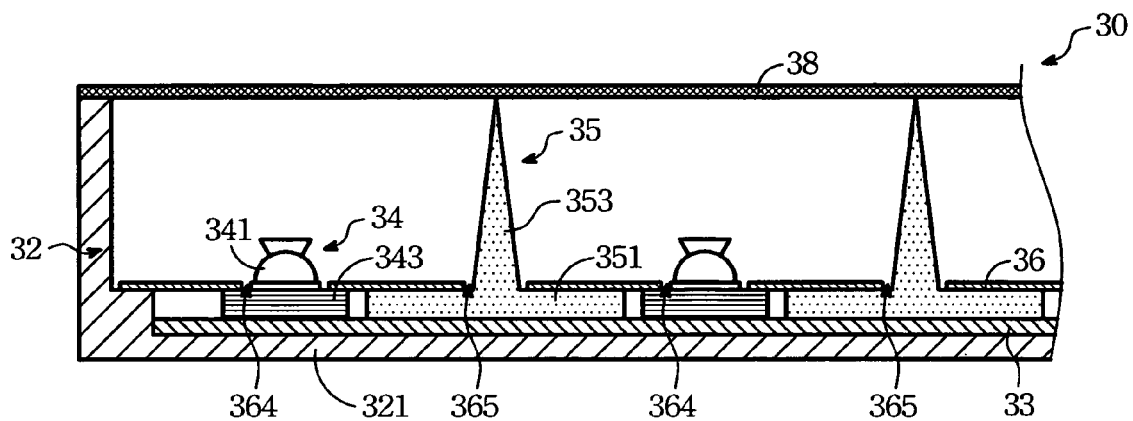
FIG. 3 is a fragmentary sectional view of the preferred embodiment of an LED module according to the present invention.

Referring to FIG. 3, a fragmentary sectional view of the preferred embodiment of an LED module 30 according to the present invention is shown to include a housing 32, a circuit board 33, at least one LED 34 (two shown in the figure), at least one support member 35 (two shown in the figure), a light reflective plate 36, and a light diffusing plate 38. The LEDs 34 shown in FIG. 3 can be employed in the light emitting lamps or signal indicator. They can also be disposed behind the display of an LCD device, thereby serving as a backlight module for illuminating the display.

The housing 32 has a base plate 321. The circuit board 33 is disposed on the base plate 321, and is electrically connected to the LEDs 34 so as to control the activation of the LEDs 34. In some embodiments (not shown here), the circuit board 33 is used for controlling the display of an LCD device, in which the display is disposed above the LED module 30.

In FIG. 3, each of the LEDs 34 has a lower mounting portion 343 disposed on the circuit board 33, and an upper light-emitting portion 341. In another embodiment shown in FIG. 4, the lower mounting portion 343 of each LED 34 can be directly mounted on the base plate 321 of the housing 20.

In FIG. 3, each of the support members 35 includes a lower portion 351 disposed on the circuit board 33, and a cone-shaped protrusive portion 353 projecting upwardly and integrally from the lower portion 351. In the embodiment shown in FIG. 4, the lower portion 351 can be directly mounted on the base plate 321 of the housing 20.

The reflective plate 36 for reflecting upward the light of the LEDs 34 is mounted in the housing 32 so as to dispose itself at an elevation above the base plate 321. The reflective plate 36 has at least one LED hole 364 (two shown in this figure) and at least one support hole 365 (two shown in this figure). The LED hole 364 sleeves around the respectively LED 34 in such a manner to expose the light-emitting portions 341 of LEDs 34 above the reflective plate 36. On the other hand, the support hole 365 is located so as to permit extension of the cone-shaped protrusive portions 353 of the support members 35 therethrough. As shown, the reflective plate 36 is located above the lower portion 351 of the support member 35 and the mounting portion 343 of the LED 34.

The diffusing plate 38 is supported by the cone-shaped protrusive portion 353. By utilizing the difference between the reflectivity of the diffusing plate 38 and that of the air, part of the light hitting the diffusing plate 38 can be reflect reciprocally between the diffusing plate 38 and the reflective plate 36 so as to thoroughly mix the light emitted by the LED/LEDs 34. Upon such an arrangement, the light leaving the diffusing plate 38 can have homogeneous brightness and color-ness.

Figure 1:
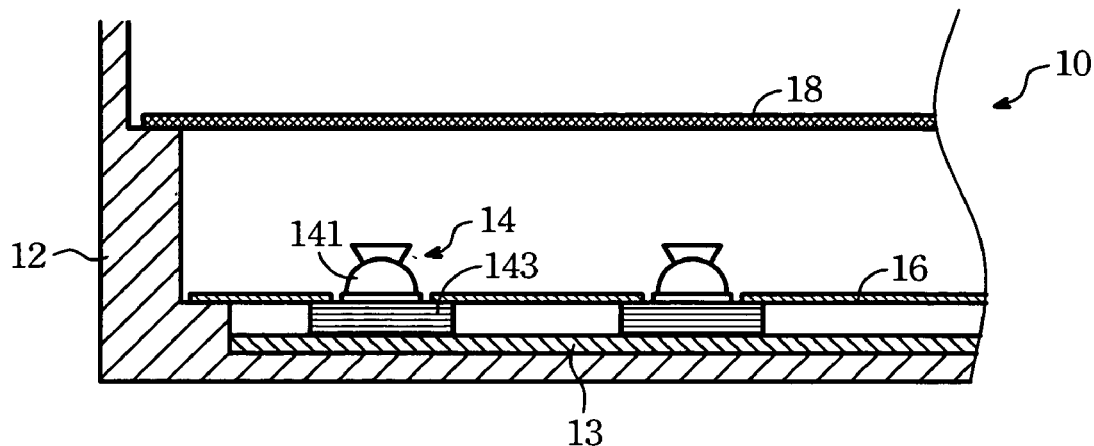
FIG. 1 is a fragmentary sectional view of a conventional LED module.
Figure 2:
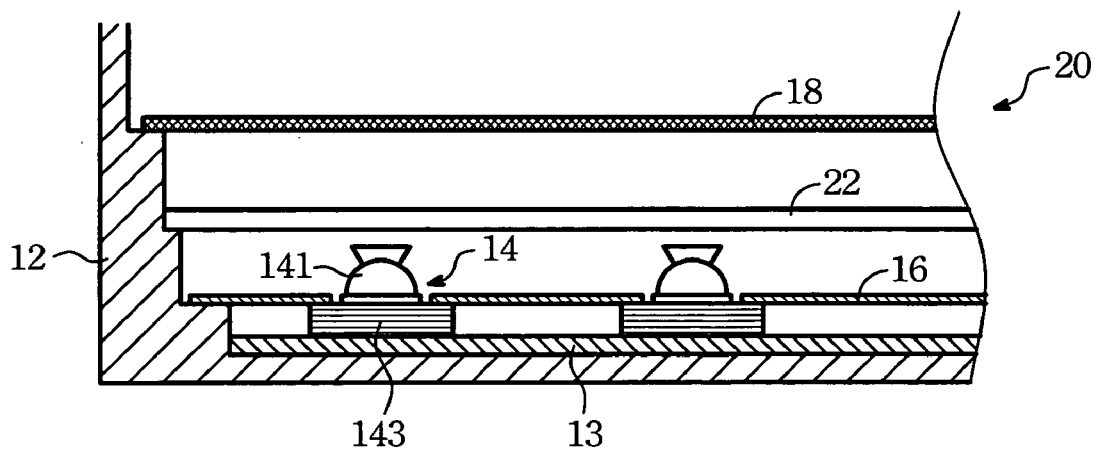
FIG. 2 is a fragmentary sectional view of another conventional LED module.

Unlike the conventional LED module of FIG. 1, the middle portions of the reflective and diffusing plates plate 36, 38 employed in the LED module of the present invention can be supported by the support members 35 so as to prevent the plates 36, 38 from downward bending. Thereby, the reflective and diffusing plates 36, 38 can extend smoothly in the horizontal direction, and can thus enable the present LED module 30 to possess uniform light brightness while is compared to the conventional LED module.

In one aspect of the present invention as typically shown in FIG. 3, the LEDs 34 and the support members 35 are disposed on the circuit board 33. Yet, in another aspect of the present invention as typically shown in FIG. 4, the LEDs 34 and the support members 35 can be disposed on the base plate 321. Generally speaking, for the lower portion 343 of the LED 34 does not emit light beams, the same is usually disposed below the reflective plate 36 in order to prevent the lower portion 343 from serving as a hindrance to the light-mixing operation between the reflective plate 36 and the diffusing plate 38. It is noted that the reflective plate 36 is mounted on the mounting portions 343 of the LEDs 34. Therefore, a spacing equal to the height of the mounting portion 343 is formed between the reflective plate 36 and the circuit board 33 of FIG. 3 (or the base plate 321 of FIG. 4). For the reflective plate 36 is generally made of metal (like aluminum), so it is vulnerable to bend by compared to the diffusing plate 38 who is made of a glass material or an acrylic material. As inserts to fill out the aforesaid spacing, the lower portions 351 of the support members 35 in accordance with the present invention are introduced to bear thereupon the reflective plate 36 with the mounting portions 343 of the LEDs 34.

Figure 4:
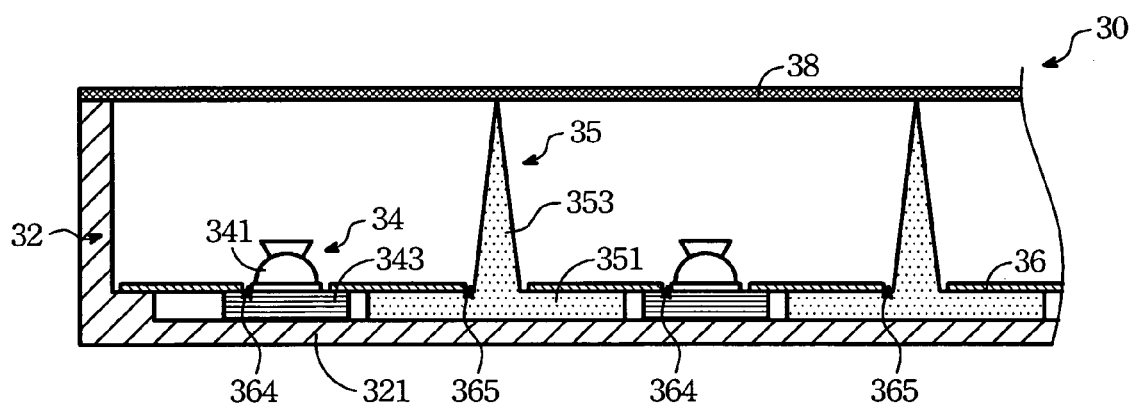
FIG. 4 is a fragmentary sectional view of a modified preferred embodiment of an LED module according to the present invention.
Figure 5:
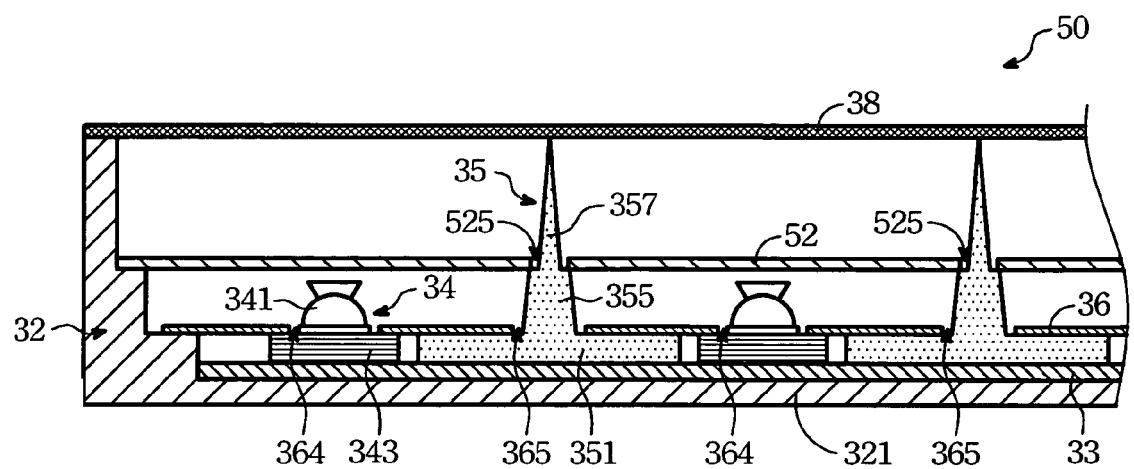
FIG. 5 is a fragmentary sectional view of another preferred embodiment of an LED module according to the present invention.

Referring to FIG. 5, another fragmentary sectional view of another preferred embodiment of the LED module 50 according to the present invention is shown to have a construction similar to the previous embodiments of FIGS. 3 and 4. The only difference resides in the structure of the support members 35 and the presence of an auxiliary diffusing plate 52. The auxiliary diffusing plate 52 of FIG. 5 is disposed between the reflective plate 36 and the diffusing plate 38. In particular, the auxiliary diffusing plate 52 is disposed more closer to the reflective plate 36 so that the light beams emitted from the LEDs 34 can hit the auxiliary diffusing plate with a wider angle of incidence. Thereby, the auxiliary diffusing plate 52 can easily and thoroughly diffuse the entire portion of the light beams upward toward the diffusing plate 38. Thus, in comparison to the embodiment shown in FIG. 3, the present LED module 50 of FIG. 5 is capable of providing a conclusive color mixing effect. For those LCD devices demanding the effective uniform color brightness are extremely suitably to select the present LED module 50 as their backlight modules. Preferably, the auxiliary diffusing plate 52 and the diffusing plate 38 are spaced apart from each other by a distance ranging 20 mm to 40 mm.

As described above in FIGS. 3 and 4, the support member 35 includes the lower portion 351, and the upper cone-shaped protrusive portion 353 projecting upwardly and integrally from the lower portion 351. Yet in this embodiment as shown in FIG. 5, the cone-shaped protrusive portion is further divided into a tip cone-shaped portion 357 distal from the lower portion 351 and a base cone-shaped portion 355 that is proximate to the lower portion 351 and that has a cross section greater than the tip cone-shaped portion 357 does so as to define an annular abutment shoulder 358 therebetween (see FIG. 6). The auxiliary diffusing plate 52 has at least a retention hole 525 (two shown in the figure) defined by hole-confining walls that are seated on the abutment shoulders 358 of the support members 35, thereby disposing the auxiliary diffusing plate 52 between the reflective plate 36 and the diffusing plate 38. It is also noted that auxiliary diffusing plate 52 is peripherally supported by a step structure of the housing 32. Under such an arrangement, the middle portion of the auxiliary diffusing plate 52 can be prevented from downward bending due to its gravity.

Figure 6:
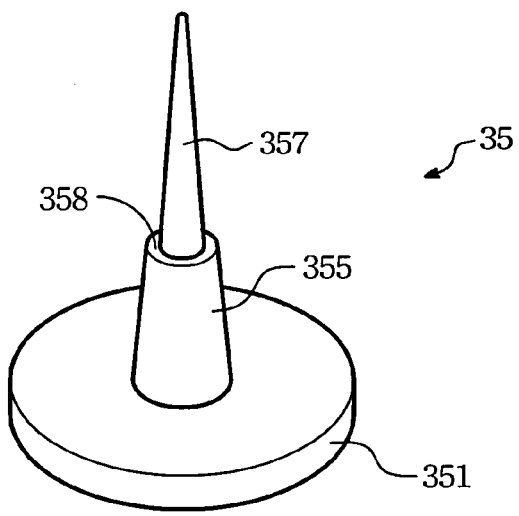
FIG. 6 is an enlarged and perspective view of a support member used in the LED module shown in FIG. 5.

Referring now to FIG. 6, the support member 35 of FIG. 5 is particularly shown. The support member 35 as a piece includes the lower portion 351, the base cone-shaped portion 355 and the tip cone-shaped portion 357. The lower portion 351 capable of supporting the reflective plate 36 is to be mounted on the circuit board 33 or the base plate 321.

As shown, the bottom of the base cone-shaped portion 355 is attached to the top surface of the lower portion 351 which has an area larger than that of the bottom of the base cone-shaped portion 355. The base cone-shaped portion 355 extrudes through the respective support hole 365 of the reflective plate 36 and extends upward to bear the auxiliary diffusing plate 52 on top thereof.

Also shown in FIG. 6, the bottom area of the tip cone-shaped portion 357 is attached to a top area of the base cone-shaped portion 355, and the top area is larger than the bottom area. The tip cone-shaped portion 357 extrudes through a respective retention hole 525 of the auxiliary diffusing plate 52 and extends upward to bear the diffusing plate 38 on top thereof. Preferably, the length of the tip cone-shaped portion 357 is ranged between about 20 mm and 40 mm.

In the present invention, the number of the LEDs or the support members can be determined by judging the dimension of the LED module. Preferably, the outer surface of the cone-shaped protrusive portion including both the tip and base cone-shaped portions can be white so as not to degrade the light-mixing operation. Alternatively, the material of the cone-shaped protrusive portion including both the tip and base cone-shaped portions can be transparent or translucent so as to reduce the influence upon the light propagation.

By virtue of arrangement of the support members in the LED module of the present invention, the prior drawbacks resulting from the use of the conventional LED module can be overcome. In addition, even if some optical films (like brightness enhancing film or prisms) are employed above the diffusing plate, the stability of the LED module of the present invention is undisturbed due to unique structure and presence of the support members.

To summarize the above paragraphs, the present invention provides an LED module with a support member so as to prevent the occurrence of downward bending of the diffusing plate and the reflective plate due to earth gravity. By virtue of the support members, the diffusing and reflective plates can extend in the horizontal direction, which, in turn, provide uniform light reflection and diffusion between the plates, thereby enabling the LED module of the present invention to possess uniform brightness.

While the invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. An LED module comprising:
   a base plate;
   at least one LED disposed on the base plate;
   at least one support member including a cone-shaped protrusive portion and a lower portion disposed on the base plate;

a reflective plate disposed above the base plate, and having at least one LED hole sleeved around the LED, and at least one support hole sleeved around the support member; and a diffusing plate disposed above the reflective plate so as to be supported by the cone-shaped protrusive portion, thereby spacing the diffusing plate apart from the reflective plate.

2. The LED module according to claim 1, further comprising a circuit board disposed on said base plate for controlling said LED.

3. The LED module according to claim 2, wherein said circuit board is electrically connected to said at least one LED.

4. The LED module according to claim 1, wherein the surface of said cone-shaped protrusive portion is substantially white.

5. The LED module according to claim 1, wherein said cone-shaped protrusive portion of said support member is transparent or translucent.

6. The LED module according to claim 1, wherein said lower portion and said cone-shaped protrusive portion are formed as a piece.

7. An LED module comprising:

a base plate;

at least one LED disposed on the base plate;

at least one support member including a lower portion disposed on the base plate, a base cone-shaped portion disposed on the lower portion, and a tip cone-shaped portion disposed on the base cone-shaped portion;

a reflective plate disposed on the lower portion by the support member, and having at least one LED hole sleeved substantially around the LED, and at least one support hole sleeved substantially around the base cone-shaped portion;

an auxiliary diffusing plate disposed on the base cone-shaped portion, and including at least one retention hole to allow the tip cone-shaped portion to penetrate therethrough; and a diffusing plate disposed on the tip cone-shaped portion.

8. The LED module according to claim 7, wherein said auxiliary diffusing plate and said diffusing plate are spaced apart from each other by a distance ranging from about 20 mm to 40 mm.

9. The LED module according to claim 7, wherein said base cone-shaped portion has a top area, and said tip cone-shaped portion has a bottom area smaller than the top area.

10. The LED module according to claim 7, further comprising a circuit board disposed on said base plate for controlling said LED.

11. The LED module according to claim 10, wherein said circuit board is electrically connected to said at least one LED.

12. The LED module according to claim 7, wherein the outer surfaces of said base cone-shaped portion and said tip cone-shaped portion are substantially white.

13. The LED module according to claim 7, wherein said base cone-shaped portion and said tip cone-shaped portion are transparent or translucent.

14. The LED module according to claim 7, wherein said lower portion, said base cone-shaped portion and said tip cone-shaped portion are made as a piece.

15. A support member for an LED module, the LED module including a base plate, a reflective plate disposed above the base plate, an auxiliary diffusing plate disposed above the reflective plate, a diffusing plate disposed above the auxiliary diffusing plate, and at least one LED disposed on the base plate and passing through an LED hole of the reflective plate, the support member comprising:

a lower portion, disposed on the base plate for supporting the reflective plate;

a base cone-shaped portion constructed on the lower portion and penetrating a support hole of the reflective plate to support the auxiliary diffusing plate; and a tip cone-shaped portion constructed on the base cone-shaped portion and penetrating a retention hole of the auxiliary diffusing plate to support the diffusing plate.

16. The support member according to claim 15, wherein the outer surface of said base cone-shaped portion and said tip cone-shaped portion are substantially white.

17. The support member according to claim 15, wherein said base cone-shaped portion and said tip cone-shaped portion are transparent or translucent.

18. The support member according to claim 15, wherein said tip cone-shaped portion has a length ranging from about 20 mm to 40 mm.

19. The support member according to claim 15, wherein said lower portion, said base cone-shaped portion and said tip cone-shaped portion are made as a piece.

20. The support member according to claim 15, wherein the upper area of the lower portion is larger than the bottom area of the base cone-shaped portion and the upper area of the base cone-shaped portion is larger than the bottom area of the tip cone-shaped portion.

* * * * *